United States Patent [19]
Colistro

[11] Patent Number: 5,113,640
[45] Date of Patent: May 19, 1992

[54] ROTARY MOWER WITH FIVE BLADE SETS

[75] Inventor: Vincent A. Colistro, Humboldt, Canada

[73] Assignee: Schulte Industries Ltd., Saskatchewan, Canada

[21] Appl. No.: 698,966

[22] Filed: May 13, 1991

[51] Int. Cl.$^5$ ..................... A01D 34/66; A01D 50/00
[52] U.S. Cl. ........................................ 56/6; 56/13.6; 56/DIG. 22
[58] Field of Search .................. 56/6, 13.6, 11.8, 10.8, 56/DIG. 22

[56] References Cited

U.S. PATENT DOCUMENTS

| | | | |
|---|---|---|---|
| 2,920,434 | 1/1960 | Ingram | 56/6 X |
| 2,968,354 | 1/1961 | Berry | 56/6 |
| 3,264,807 | 8/1966 | Wallace | 56/13.6 X |
| 3,452,530 | 7/1969 | Kulak | 56/6 X |
| 3,473,302 | 10/1969 | Caldwell | 56/6 |
| 4,538,400 | 9/1985 | Hottes | 56/6 X |

Primary Examiner—Stephen J. Novosad
Attorney, Agent, or Firm—Jacobson and Johnson

[57] ABSTRACT

A rotary mower of extra wide configuration has five cutters. The center cutter is mounted on a center section of the mower, while two wings on opposite sides of the center section carrying two cutters each. The cutters only wings include inner cutters offset forwardly from the center cutter and outer cutters offset rearwardly from the inner cutters. This provides the necessary overlap of the swaths cut by the individual cutters while providing a relatively compact mower in terms of overall length. The wheels supporting the center section are mounted outboard of the center section, behind the respective wings to provide good transport stability.

11 Claims, 2 Drawing Sheets

ROTARY MOWER WITH FIVE BLADE SETS

FIELD OF THE INVENTION

The present invention relates to mowers and more particularly to an extra wide rotary mower.

BACKGROUND OF THE INVENTION

Conventional rotary mowers for heavy duty grass and brush cutting have three cutters, a centre cutter and two wing cutters that can be raised from a working position to a transport position. Attempts have been made to use five cutters in a mower, but these have proven unsatisfactory. The large, delta shape provided by five cutters is impractically long. Additionally, this format requires that the transport wheels on the centre section are inside the wings, so that the track is quite narrow and transport stability is not exceptionally good.

Another difficulty with the prior art machines is the drive configuration. A stopping rotation of the centre cutter causes immediate stoppage in rotation of all five cutters, thus imposing very high shock loadings on the drive line.

The present invention is concerned with a novel five cutter mower of this type.

SUMMARY OF THE INVENTION

According to the present invention there is provided a rotary mower for cutting vegetation as the mower advances in a forward direction, the mower comprising:
  a centre mower section;
  two wing mower sections;
  hinge means pivotally mounting the wing sections on opposite sides of the centre section;
  a centre cutter mounted on the centre section;
  two wing cutters mounted on each wing section, the wing cutters on each wing section including an inner cutter mounted on the wing at a position offset forwardly with respect to the centre cutter, and an outer cutter mounted on the wing laterally outwardly of and to the rear of the inner cutter.

Setting the centre cutter to the rear of the inner wing cutters yields a compact, zig-zag layout. It also allows the transport wheels to be mounted outboard of the centre section, thus improving transport stability.

In the preferred embodiments of the present invention the drive system includes a dedicated divider gear box driving the centre cutter from a centre output and the two cutters on each wing with respective ones of two other outputs. The drive for each cutter is equipped with a torque limiting clutch so that stoppage in any cutter does not cause complete stoppage of all five cutters.

BRIEF DESCRIPTION OF THE DRAWINGS

In the accompanying drawings which illustrate an exemplary embodiment of the present invention.

DETAILED DESCRIPTION

Figure 1:
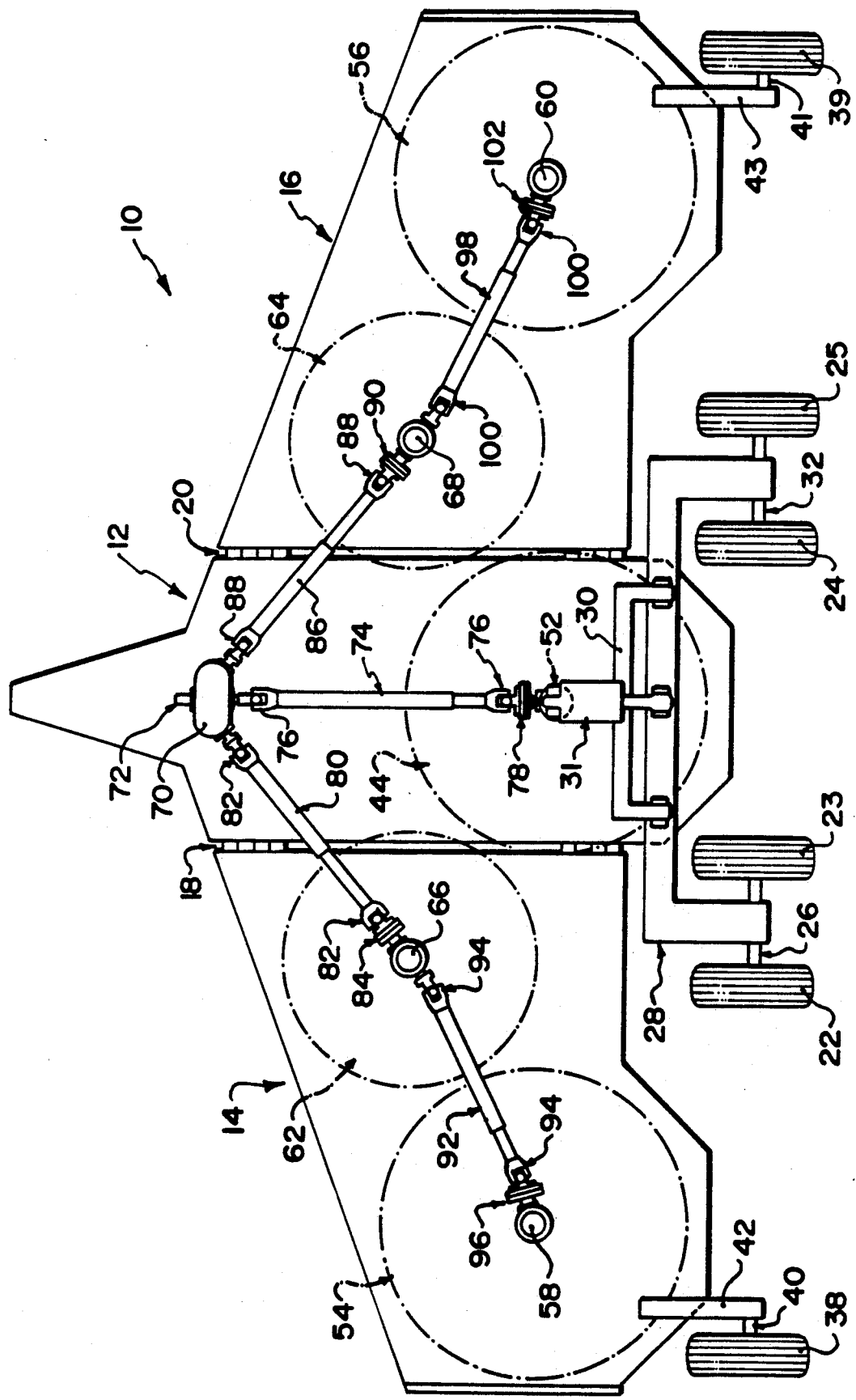
FIG. 1 is a plan view of a mower according to the present invention.

Referring to the accompanying drawings, there is illustrated a rotary mower 10 constructed according to the present invention. The mower has a housing with a centre section 12 and two wing sections 14 and 16 mounted on opposite sides of the centre section by hinges 18 and 20 respectively. The hinges are parallel and extend in the direction of travel to allow the wings to be folded up for transport purposes.

The centre section 12 of the mower has a pair of wheels 22 and 23 on one side, at the rear and a second pair of wheels 24 and 25 on the opposite sides. The wheels are arranged outboard of the centre section, thus providing a wide track for good transport stability. The wheels 22 and 23 are mounted on an axle 26 carried by a support 28. The support is pivotally mounted on a bracket 30 fixed to the centre section of the mower housing. The support is pivoted on the bracket by a hydraulic cylinder 31 extending between lugs on the support and the bracket.

The wheels 24 and 25 are likewise mounted on an axle 32 carried by the support 28. They are raised and lowered by the hydraulic cylinder 31.

The outer ends of the wings 14 and 16 are supported by means of support wheels 38 and 39 mounted on the wing by axles 40 and 41 respectively, carried by support arms 42 and 43 respectively.

The centre section of the mower carries a centre cutter 44 that is set towards the back of the centre section. It includes a blade set consisting of a rotor 48 and two flail type blades 50. The rotor is driven by a gear box 52 mounted on top of the centre section 12.

The wings 14 and 16 carry outer cutters 54 and 56 that are similarly constructed with rotors and blades. These are driven by respective gear boxes 58 and 60. The wings 14 and 16 also carry inner cutters 62 and 64 respectively, driven by gear boxes 66 and 68 respectively. These inner cutters, like the others, are composed of rotors and blades. They are offset forwardly with respect to the centre cutter and the outer cutters to provide a zig-zag layout with the inner cutters leading. As can be seen most particularly in FIG. 1, this ensures that the swaths cut by the individual cutters may overlap as desired, while providing a much shorter unit than would be the case with the centre cutter leading the two cutters 62 and 64. It also allows the support wheels for the centre section to be mounted outboard while still maintaining a relatively short configuration for the mower.

The mower is driven from a tractor power take off through an appropriate power take off shaft and a splitter gear box 70 that has an input 72 and three outputs. The centre output drives the centre cutter gear box 52 through a shaft 74 having two universal joints 76 and a torque limiter clutch 78 in the drive train. One of the side outputs drives the inner wing cutter 62 through a shaft 80 with two universal joints 82 and a torque limiter clutch 84 in the power train. Similarly, the other side output drives the gear box 68 through a wing shaft 86 with two universal joints 88 and a torque limiter clutch 90. The shafts 82 and 86 are telescopically collapsible to accommodate lifting of the wings to their transport positions.

The outer cutter gear box 58 is driven from the gear box 66 using an outer wing shaft 92 coupling the gear boxes. The shaft has two universal joints 94 and a torque limiter clutch 96. Similarly, the gear box 60 of the outer cutter 56 is driven from the gear box 68 of the inner cutter 64 through the use of an inner wing shaft 98 which contains two universal joints 100 and a torque limiter clutch 102.

With this drive arrangement, the stoppage of any on of the rotors by impact with a foreign object does not stop the whole drive train. At worst, where an inner cutter 62 or 64 is stopped, both cutters on the one wing will ceas rotation. The remainder of the apparatus will continue in operation, thus limiting shock loadings on the system.

Figure 2:
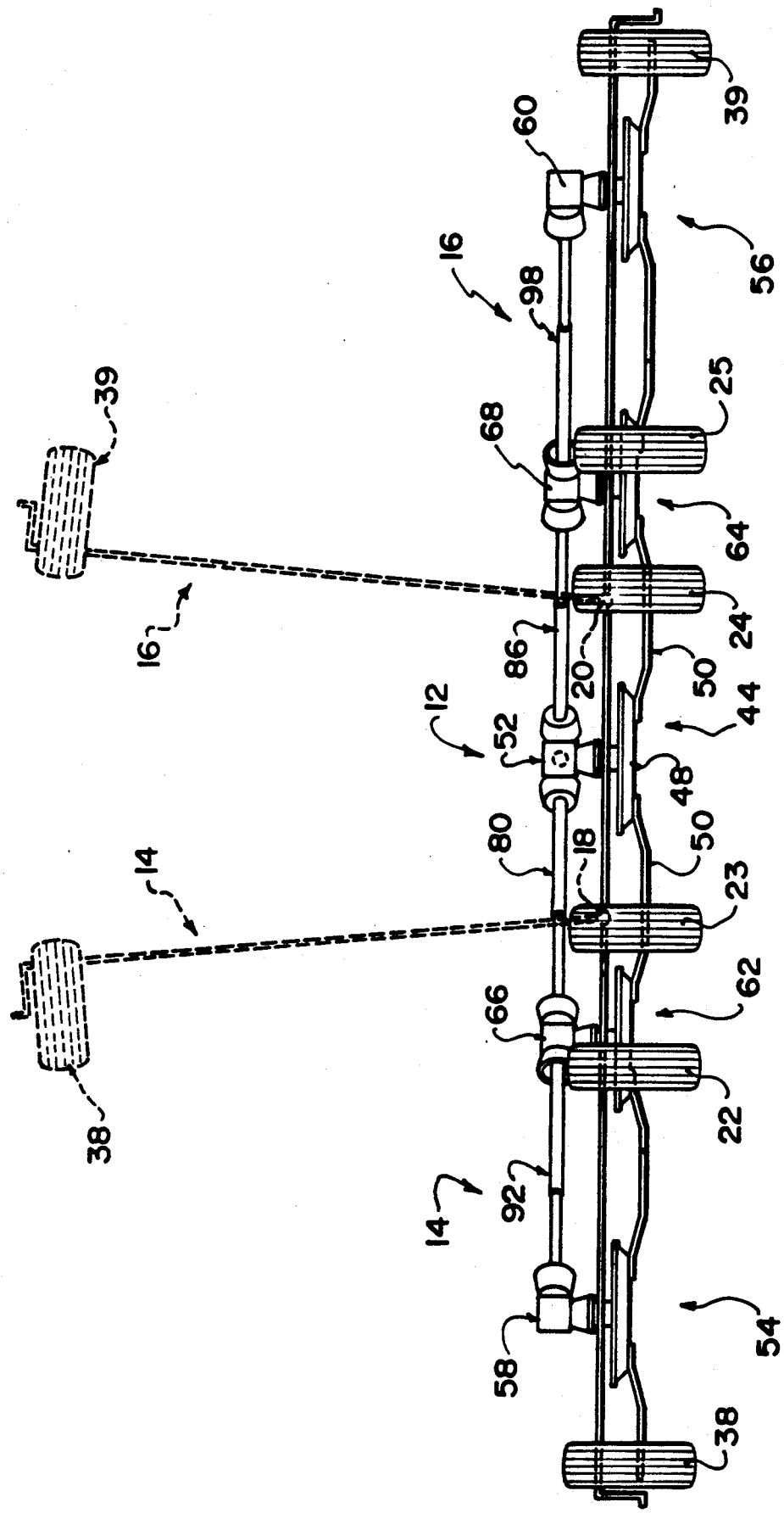
FIG. 2 is a rear elevation of the cutter.

For transport purposes, the two wings 14 and 16 can be lifted to the position illustrated in broken line in FIG. 2 using a hydraulic cylinder (not shown).

While one embodiment of the present invention has been described in the foregoing, it is to be understood that other embodiments are possible within the scope of the invention. The invention is to be considered limited solely by the scope of the appended claims.

We claim:

1. A rotary mower for cutting vegetation as the mower advances in a forward direction, the mower comprising:
   a centre mower section;
   two wing mower sections;
   hinge means pivotally mounting the wing sections on opposite sides of the centre section;
   a centre cutter mounted on the centre section;
   two wing cutters mounted on each wing section, the wing cutters on each wing section including an inner cutter mounted on the wing at a position offset forwardly with respect to the centre cutter, and an outer cutter mounted on the wing laterally outwardly of and to the rear of the inner cutter.

2. A mower according to claim 1 including transport wheels mounted on the centre section at least partially rearwardly of the wing sections.

3. A rotary mower according to claim 2 including wing wheels mounted on each wing for supporting the wings.

4. A rotary mower according to claim 1 including drive means for driving the centre cutter means and the wing cutters, the drive means including a divider gear box with an input and a plurality of outputs, and power transmitting means connecting the outputs to the respective cutters.

5. A mower according to claim 4 wherein the outputs include a centre output and two wing outputs.

6. A mower according to claim 5 wherein the power transmission means including a centre drive shaft extending from the centre output to the centre cutter.

7. A mower according to claim 6 wherein the power transmission means include two inner wing drive shafts extending from their respective wing outputs to the respective inner cutters.

8. A mower according to claim 7 wherein the power transmission means include two outer wing drive shafts extending from respective ones of the inner cutters to respective ones of the outer cutters.

9. A mower according to claim 8 including a torque limiter coupled to each drive shaft.

10. A mower according to claim 9 wherein each drive shaft includes two universal joints.

11. A mower according claim 1 including means for raising the wings to respective transport positions upstanding from the centre section.

* * * * *